G. R. RADLEY.
MOTOR CONTROLLER.
APPLICATION FILED JUNE 3, 1912.
1,110,821.
Patented Sept. 15, 1914.
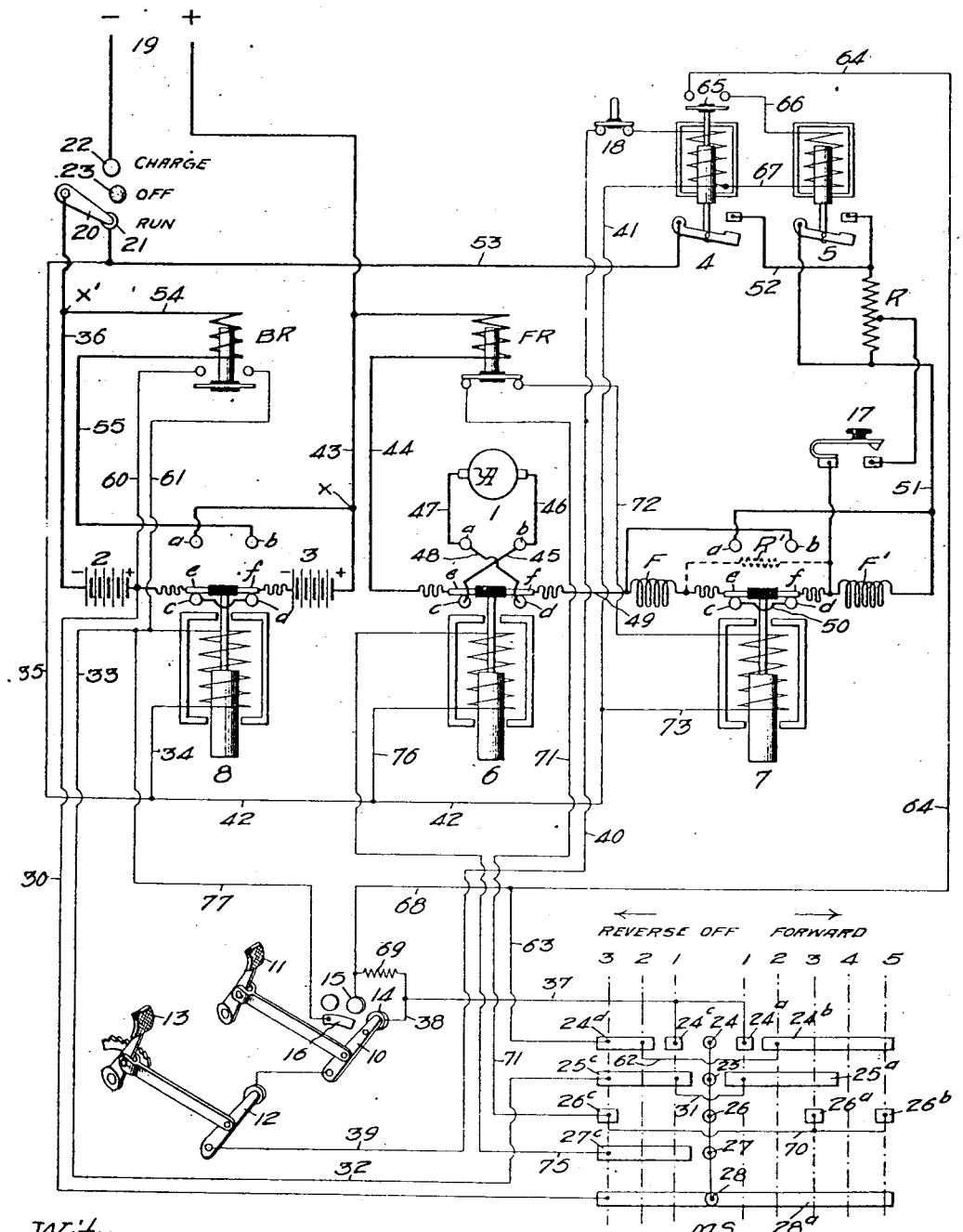
Witnesses:
Inventor:
Guy R. Radley.
By Edwin B. H. Tower, Jr.
ATTY.

UNITED STATES PATENT OFFICE.

GUY R. RADLEY, OF MILWAUKEE, WISCONSIN, ASSIGNOR TO THE CUTLER-HAMMER MFG. CO., OF MILWAUKEE, WISCONSIN, A CORPORATION OF WISCONSIN.

MOTOR-CONTROLLER.

1,110,821.   Specification of Letters Patent.   Patented Sept. 15, 1914.

Application filed June 3, 1912. Serial No. 701 404.

*To all whom it may concern:*

Be it known that I, GUY R. RADLEY, a citizen of the United States, residing at Milwaukee, in the county of Milwaukee and State of Wisconsin, have invented new and useful Improvements in Motor-Controllers, of which the following is a full, clear, concise, and exact description, reference being had to the accompanying drawing, forming a part of this specification.

My invention relates to improvements in motor controllers and more particularly to controllers for electric vehicles, although certain features thereof may be advantageously employed in other relations.

One of the objects of the invention is to provide a simple, efficient and reliable controller for commutating the windings of the controlled motor, or the supply batteries, or both.

A further object is to provide means for automatically regulating the supply of power to insure safe and economical control.

A still further object is to provide a safe and reliable vehicle controller whereby certain steps of control may be effected by a switch or switches operable by one or both brake pedals.

Other objects and advantages will hereinafter appear.

For the purpose of fully and clearly disclosing the nature and advantages of my invention I shall describe the controller diagrammatically illustrated in the accompanying drawing. It should of course be understood that the controller illustrated is susceptible of various modifications.

The controller illustrated is designed particularly for electric automobile service.

The driving motor 1 has an armature A and series field windings F and F'. As will later be set forth, the field windings are adapted to be connected in either series or parallel relation to vary the speed of the motor. Of course other types of motors might be employed and the field regulation thereof obtained by other means than series-parallel field connections. Storage batteries 2 and 3 are provided for supplying power to the motor. The batteries are adapted to be connected in either series or parallel relation to vary the potential and current conditions in the motor circuit.

The controller includes an electroresponsive main switch 4 for connecting the motor to the batteries through a resistance R, an electro-responsive accelerating switch 5 for short circuiting the resistance R, an electroresponsive armature reversing switch 6, an electroresponsive series-parallel switch 7 for the field windings and an electroresponsive series-parallel switch 8 for the batteries. These switches are all controlled by a master switch MS which in the drawing is developed as a drum controller but which in practice may assume any desired form. The controller also includes a battery relay switch BR and a field relay switch FR. The battery relay switch has an operating winding connected in series with one of the batteries when the batteries are connected in parallel and functions to prevent the changing of the batteries to series relation, while certain electrical conditions prevail. It is rendered inoperative as soon as the batteries are connected in series. The operating winding of the field relay is permanently connected in series in the motor circuit and responds under certain conditions to prevent the weakening of the motor field by paralleling the field windings and to change the field windings back to series relation if previously connected in parallel. The provision of these relays and the particular arrangement thereof constitute an important feature of the controller, as will later be apparent.

In electric automobiles it is very desirable and often imperative to be able to control the motor by the brake levers. I have accordingly associated with the controller a switch 10 for connection to the service or non-locking brake lever 11 and a switch 12 for connection to the emergency or locking brake lever 13. The switch connected to the emergency brake lever disconnects the motor from circuit immediately upon application of the emergency brake and the controller is so designed that when the motor has been thus disconnected it can only be again connected by operation of the master switch or by the service brake switch in a manner hereinafter set forth. The service brake switch on the other hand is adapted to disconnect the motor from circuit when the brake is applied and to again connect the motor in circuit when the brake is released. This service brake switch is provided with stationary contacts 14, 15 and 16, which contacts it engages in different positions of the brake lever, as will be hereinafter set forth.

In addition to the foregoing, the controller is provided with a normally open switch 17 which may be operated either by hand or by foot to connect a portion of the starting resistance in parallel to the field windings when connected in parallel to further reduce the field strength and accordingly further accelerate the motor. Still further, the controller is provided with a normally closed switch 18 in circuit with the operating winding of the main switch. This switch is adapted to be opened upon the opening of the vehicle door to disconnect motor from circuit when in operation and to prevent the motor from being started until the door is closed.

As will later be seen, when the master switch is in off position the batteries are connected in series and accordingly are in a proper relation to be charged, from a suitable charging circuit 19. The batteries are adapted to be connected to the charging circuit by a switch 20. This switch has three positions, namely, a running position in which it engages a contact 21 connecting the batteries to the motor circuit, a charging position in which it engages a contact 22 to connect the batteries to one side of the charging circuit and an off position in which it engages a dead contact 23. The opposite side of the charging circuit is permanently connected to one side of the batteries.

Switches 6, 7 and 8 are double-pole double-throw switches each having a set of up contacts a and b, a set of down contacts c and d, and insulated movable contacts e and f. When these switches are deënergized their movable contacts engage the down contacts. The master switch is provided with a set of contact fingers 24, 25, 26 and 27 adapted to be moved into engagement with either one or two sets of contact segments disposed on opposite sides thereof. An additional finger 28 is provided to continually engage a segment 28ª. The fingers are all electrically connected. The segments on the right of the fingers are designated as 24ª, 24ᵇ, 25ª, 26ª and 26ᵇ and those on the left of said fingers are designated as 24ᶜ, 24ᵈ, 25ᶜ, 26ᶜ and 27ᶜ.

I shall now described the operation of the controller: With the various switches of the controller in the positions illustrated, the motor is disconnected from circuit. It may be started by movement of the master controller in either direction according to the direction of operation desired. If forward operation is desired, the controller is moved to the right, causing finger 25 to first engage segment 25ª. This completes a circuit from the positive terminal of battery 2 by conductor 30 to segment 28ª and finger 28 to finger 25 and segment 25ª by conductor 31 to segment 25ᶜ by conductors 32 and 33 through the operating winding of battery switch 8 by conductors 34 and 35 through switch 20 by conductor 36 to the negative side of battery 2. Switch 8 thereupon responds causing its movable contacts e and f to engage the up contacts a and b respectively. The movable contacts e and f are connected by flexible conductors to opposite terminals of batteries 2 and 3 and the engagement of contacts e and f with up contacts a and b places the batteries in parallel. Continued movement of the master controller to the full first position causes finger 24 to engage finger 24ª which completes a circuit from the positive terminal of battery 2 to the master switch fingers as already traced, thence to segment 24ª by conductors 37 and 38 through service brake switch 10 and emergency brake switch 12 by conductors 39 and 40 through the door switch 18 and thence through the operating winding of the main switch by conductors 41 and 42 to conductor 35, which as already described leads back to the negative terminal of battery 2. Thereupon main switch 4 closes and connects the motor to the batteries. With the battery switch in up position the positive terminals of the batteries are connected at the point marked "x". From this point the motor circuit extends by conductor 43 through the operating winding of the field relay switch FR by conductor 44 through contacts c and c of the reversing switch by conductors 45 and 46 through the motor armature in a left hand direction by conductors 47 and 48 through the reversing contacts f and d, by conductor 49, through field winding F, contacts e and c of the field switch by conductor 50 through contacts f and d of the field switch, thence through field winding F' by conductor 51 through the resistance R by conductor 52 through main switch 4 by conductor 53 through switch 20 to the point marked x'. Here the circuit divides, one branch extending by conductor 36 to the negative terminal of battery 2 and the other branch extending by conductor 54 through the winding of battery relay BR by conductor 55 through the contacts b and f of the battery switch 8 to the negative terminal of battery 3. The motor is thus started, but with the resistance R included in the circuit therewith. When the motor circuit is thus closed there is likely to be a heavy surge of current in the motor circuit and if this surge is sufficiently heavy the relays BR and FR will respond. These relays of course may be adjusted to respond at any predetermined current value. The relay BR upon responding establishes a maintaining circuit for the battery switch in parallel to the master switch. This maintaining circuit may be traced from the positive terminal of the battery 2 by conductor 60 through the battery relay switch by conductor 61 to conductor 33. Thus so long as this relay remains up the batteries will be maintained in parallel relation. The relay switch FR, as will later be more specifically set forth, is in series with the operating winding of the field switch and accordingly if it responds it will prevent the operation of the field switch. When the controller is moved to the second forward position a circuit will be closed from segment 24$^b$ by conductor 62 to segment 24$^d$ by conductors 63 and 64 through an auxiliary switch 65 closed upon closure of the main switch, by conductor 66 through the operating winding of accelerating switch 5 by conductor 67 to conductor 41 and thence to negative side of battery 2, as already traced. Switch 5 thereupon responds short-circuiting the resistance R and accordingly accelerating the motor. When the full second position is reached circuit is broken between finger 24 and segment 24$^a$, but this circuit is not broken until after finger 24 engages segment 24$^b$, whereupon a maintaining circuit is established for the main switch 4. This maintaining circuit prevents the dropping out of switch 4 upon disengagement of the finger 24 from the segment 24$^a$. The maintaining circuit extends from segment 24$^b$ to segment 24$^d$ by conductors 63 and 68 through a maintaining and interlocking resistance 69 to conductor 38. Should the main switch 4 from any cause become deënergized after the establishment of these connections it could not again respond until the resistance 69 was short circuited. This resistance can only be short circuited by returning the master controller to the first position or by moving the service brake switch 10 into engagement with contact 15. This, as will be later apparent insures against the motor being started at any but the proper speed. When the master controller has moved to the third position circuit is closed from finger 26 to segment 26$^a$ by conductor 70 to segment 26$^c$ by conductor 71 through the field relay switch, by conductor 72 through the operating winding of the field switch 7 by conductor 73 to conductor 42 and thence to the negative side of the batteries. The field switch thereupon responds changing the relation of the field windings F and F' from series to parallel. This further accelerates the motor. Should the current in the motor circuit exceed a predetermined value when the third position is reached the relay FR would be in up position thereby preventing the closure of the energizing circuit of the field switch. This would prevent the changing of the field from series to parallel relation until normal conditions were restored. Further, should the current in the motor circuit rise above said predetermined degree after the field windings were connected in parallel due to an increased load, as for example would result from ascending a steep grade, the relay would respond thereby deënergizing the field switch and reëstablishing the series connections between the field windings. This would result in building up the field strength and consequently increasing the torque of the motor and reducing the power consumption. Thus the relay FR insures economy of power and full field strength under heavy load conditions. The building up of the field strength and reduction of power of course tends to protect the motor and other parts likely to be injured by an excess of current. When the master switch is moved to the fourth position contact is first broken between finger 26 and segment 26$^a$ thereby deënergizing the field switch which results in reëstablishing the series connections between the field windings. When the full fourth position is reached the finger 25 is disengaged from segment 25$^a$ thereby deënergizing the battery switch, which upon dropping reëstablishes the series connection between the batteries. This further accelerates the motor. The operation of the battery switch, however, is subject to the control of the relay BR as before explained, for should the current in the motor circuit exceed a predetermined value at the time the master controller was moved to the fourth position the relay BR would be energized completing the maintaining circuit for the battery switch 8 as before described. Under such conditions the movement of the controller to the fourth position would have no effect upon the battery connections, which would remain the same until the motor current had dropped to the proper value to release the relay BR. Thus the relay BR will maintain the parallel connections between the batteries so long as the motor current exceeds a predetermined value, thereby coöperating with the relay FR to insure economy of power and safe control. When, however, the relay BR once drops after the master controller has reached the fourth position it is rendered inoperative until the master controller is returned to the third position or the service brake switch is operated in the manner hereinafter set forth. Movement of the controller to the fifth position again energizes the field switch, subject however to the operation of the field relay, to reëstablish parallel connections between the field windings to further increase the speed of the motor. This gives the maximum speed obtainable by the master controller. Should a still higher speed be desired the switch 17 is operated to connect a portion of the resistance R in parallel with the field windings. This results in still further weakening the motor field and accordingly increasing the speed of the motor. To reverse the motor to run the machine in the opposite direction it is only necessary to reverse the operation of the contact fingers 24 moving them into engagement with the left hand set of segments. Upon initial movement in this direction circuit is first closed through the operating winding of the battery switch to cause said switch to connect the batteries in parallel and at the same time circuit is closed through the operating winding of the armature reversing switch. This circuit may be traced to finger 27 to segment 27ᶜ by conductor 75 through the operating winding of switch 6 by conductor 76 to conductor 35. The switch 6 thereupon responds connecting the positive terminals of the batteries through reversing switch contacts c, a to the left hand terminal of the motor armature and connecting the right hand terminal of the motor armature through reversing contacts b, f to the field coils. This causes current to flow through to the motor armature in a right hand direction and accordingly reverses the operation thereof. In the full first reverse position of the master controller, circuit is closed through the operating winding of the main switch 4 which thereupon responds completing the motor circuit. In the second position the switch 5 is energized to short circuit the resistance R and in the third position the switch 7 is energized, subject however to the control of the relay FR to parallel the field windings F and F'. Of course higher speeds might be provided for on reverse if desired, but ordinarily the paralleling of the field windings with batteries in parallel gives a speed sufficiently high for all practical purposes.

I will now describe the operation and function of the brake switches 10 and 12: First, referring to the service brake switch, the same normally stands in engagement with contact 14. When however the service brake lever is operated to apply its mechanical brake, it first moves the switch 10 into engagement with contacts 15 and 16 while taking up the slack in the brake rigging and before the brake shoes actually touch and begin retarding the car speed, the lever 10 will have passed out of engagement with contact 15. This interrupts the maintaining circuit of the main switch 4 causing said switch to drop out and disconnect the motor from circuit. Switch 4 in dropping out de-energizes switch 5 thereby re-inserting the resistance R in circuit. Thus this operation of the service brake lever disconnects the motor from circuit and enables the car to be checked or even stopped without operation of the master controller. Assuming now that the master controller is left in the fourth forward position after the motor has been stopped the motor may be restarted by the service brake lever. Upon release of this lever the switch 10 is moved into engagement with contacts 15 and 16. This results in reestablishing the energizing circuit of main switch 4, which may be traced from master switch segment 24ᵇ to 24ᵈ by conductors 63 and 68 through the switches 10 and 12 by conductors 39 and 40 through the winding of switch 4 as already traced. At the same time circuit is closed from conductor 68 to contact 15 across switch 10 to contact 16 and thence by conductor 77 through the operating winding of the battery switch 8 by conductor 35 to the negative side of the batteries. The switch 8 thereupon responds connecting the batteries in parallel, as previously described. After the motor is thus started the switch 5 automatically responds to cut out the resistance R from circuit and after the switch 5 responds then the field switch will automatically respond subject to the control of the relay FR to parallel the field windings F and F'. Then if the service brake switch 10 is permitted to move out of engagement with contacts 15 and 16 and into engagement with contact 14 the battery switch will under the proper conditions drop out to reestablish series connections between the batteries. It will be observed, however, that in starting the motor by the service brake switch the battery relay is again connected in circuit and accordingly will prevent the reestablishment of series connections between the batteries so long as abnormal current conditions prevail in the motor circuit. Thus the same protection against injury and waste of power is insured upon starting the motor by the service brake switch as upon starting the motor by the master controller.

The emergency brake switch 12 is normally closed and is opened upon application of the emergency brake. When it opens it breaks the maintaining circuit of the main switch 4 thereby disconnecting the motor from circuit as above described. This switch while effective to open the motor circuit in an emergency is ineffective to reclose the same. Reclosure of the motor circuit by reclosure of this switch is prevented by the interlocking resistance 69, which when the service brake switch 10 stands in normal position is connected in series with the operating windings of the main switch 4. This resistance is of such a design as to so reduce the flow of current through the operating winding of switch 4 as to prevent response of said winding. After opening the motor circuit by the emergency brake switch the motor circuit can only be reclosed by the master switch or by the service brake switch.

A further feature of the controller consists in connecting the contacts e and f of the field controlling switch 7 through a resistance R' (shown in dotted lines). This resistance performs a double function. As will be readily apparent, it is short circuited by the field switch when in position to connect the field windings in series and parallels the field windings when said switch responds to connect said windings in parallel. This obviously augments the increase in speed obtained by the operation of the field switch, for the inclusion of the resistance in parallel to the field windings further decreases the field strength. Thus by varying the value of the resistance the degree of acceleration obtained by operation of the field switch may be regulated as desired. It enables the same degree of speed variation being obtained by the field switch as by the battery switch. Secondly, the resistance R' maintains circuit between contacts $e$ and $f$ of the field switch as it moves from series to parallel position. This preserves the continuity of the motor circuit during the change of the field connections and eliminates arcing at the contacts of the field switch. It will thus be seen that while this resistance may not be essential it is highly desirable.

Having thus described my invention, what I claim as new and desire to secure by Letters Patent is:—

1. In a motor controller, in combination, batteries for supplying power, means for commutating said batteries from parallel to series including governing means insuring against establishment of series connections except under normal power conditions and a controller adapted to be set to cause operation of said commutating means automatically to establish series connections for said batteries upon restoration of normal power conditions following an abnormal power variation.

2. In a motor controller, in combination, batteries for supplying power, electro-responsive means for connecting said batteries in either series or parallel relation, electro-responsive means responsive to prevent operation of said former means to establish series connections, and a master controller adapted to be set to cause automatic operation of said first-mentioned means when said second-mentioned means becomes ineffective.

3. In a motor controller, in combination, storage batteries for supplying power, electro-responsive means adapted when deënergized to connect said batteries in series and upon response to connect the same in parallel, and automatic means tending to maintain said electro-responsive means energized so long as certain electrical conditions prevail.

4. In motor controller, in combination, storage batteries for supplying power, electro-responsive means adapted when deënergized to connect said batteries in series and upon response to connect said batteries in parallel, and a controller for said means.

5. In a motor controller, in combination, storage batteries for supplying power, means for connecting said batteries in either series or parallel, and an electro-responsive governing device for said means included in circuit upon the establishment of parallel connections and disconnected from circuit upon the establishment of series connections.

6. In a motor controller, in combination, storage batteries for supplying power, electro-responsive means responsive to change the connections of said batteries from series to parallel, and means responsive to certain electrical conditions to prolong energization of said former means to maintain parallel connections for said batteries, said latter means being inoperative except while said batteries are connected in parallel.

7. In a motor controller, in combination, batteries for supplying power, electro-responsive means responsive to change the connections of said batteries from series to parallel, and a current relay responsive to maintain said means energized while predetermined electrical conditions prevail, said relay being disconnected from circuit upon interruption of the parallel connections of said batteries.

8. In a motor controller, in combination, batteries for supplying power to the motor, means for connecting said batteries in either series or parallel, field-weakening means for the motor, means automatically responsive to insure against operation of said latter means while predetermined electrical conditions prevail, and means automatically responsive to insure against operation of said first-mentioned means to connect said batteries in series while predetermined electrical conditions prevail, said last-mentioned means being effective only while parallel battery connections are established.

9. In combination, a motor, batteries for supplying power thereto, electro-responsive means for connecting said batteries in series or parallel, electro-responsive means for controlling the field strength of said motor, and electro-responsive relays for separately controlling the aforesaid means to prevent the establishment of series battery connections and field-weakening of the motor while certain electrical conditions prevail in the motor circuit, the operating winding of said battery relay being connected in series with but one of said batteries, and the winding of the other relay being connected in series with both of said batteries.

10. In combination, a motor, batteries for supplying power thereto, electro-responsive means for connecting said batteries in series or parallel, electro-responsive means for controlling the field strength of said motor, and electro-responsive relays for separately controlling the aforesaid means to prevent the establishment of series battery connections and field-weakening of the motor while certain electrical conditions prevail in the motor circuit, the operating winding of said battery relay being connected in series with but one of said batteries, and excluded from circuit by series connection of said batteries.

11. In a motor controller, in combination, batteries for supplying power, means for commutating said batteries from parallel to series including governing means insuring against commutation of the batteries from parallel to series except under normal power conditions, means for weakening the field of the motor including governing means insuring against operation thereof except under normal power conditions and a master controller for said battery commutating means and said field weakening means adapted to be set to cause either or both of the same to operate automatically upon restoration of normal power conditions following an abnormal power variation.

12. In a motor controller, in combination, batteries for supplying power, electro-responsive means for connecting said batteries in either series or parallel, electro-responsive means effective while abnormal electrical conditions prevail to prevent operation of said former means to establish series connections, electro-responsive field-weakening means for the motor, electro-responsive means for preventing operation of said field-weakening means while abnormal electrical conditions prevail and a master controller for said battery-controlling means and said field-controlling means adapted to be set to cause automatic operation thereof upon restoration of normal conditions.

13. In a motor controller, in combination, series and parallel connections for the motor field windings, and electro-responsive means adapted when deënergized to complete said series connections and open said parallel connections and when energized to complete said parallel connections.

14. In a motor controller, in combination, series and parallel connections for the motor field windings, a resistance included in said series connections, means adapted in one position to open said parallel connections and short-circuit said resistance and when in another position to close said parallel connections and interrupt the short-circuit around said resistance.

15. In a motor controller, in combination, series and parallel connections for the motor field windings, a resistance included in said series connections, and electro-responsive means adapted when deënergized to short-circuit said resistance and open said parallel connections and when energized to complete said parallel connections and interrupt the short-circuit around said resistance.

16. The combination with a plurality of electrical devices, of means for connecting the same in either series or parallel comprising a switch having two pairs of contacts adapted to engage to establish parallel connections and a contact device to bridge one of said pairs of contacts to establish series connections.

17. The combination with a plurality of electrical devices, of means for establishing either series or parallel connections therefor without interrupting the continuity of the circuit thereof consisting of two contacts, a resistance connecting the same, and coöperating contacts therefor comprising two electrically independent contacts and an electrical bridge.

18. In a controller for motor operated vehicles, in combination, means including a device to be actuated by the operator for establishing running connections, a door switch associated with said means to effect interruption of said connections upon a predetermined movement of said switch and means preventing reëstablishment of said connections until said door switch is reset and until said first device is moved to a predetermined position.

19. In a motor controller, in combination, batteries for supplying power, series and parallel connections for said batteries and electro-responsive means adapted, when deënergized, to complete said series connections and interrupt said parallel connections and upon response to complete said parallel connections and interrupt said series connections.

20. In a controller for electric vehicles, in combination, electro-responsive means for controlling the power supply, a hand controller for said electro-responsive means and a switch adapted to be connected to a brake operating mechanism of the vehicle for controlling said electro-responsive means to interrupt the power supply independently of said hand controller and to reëstablish the power supply but only when said hand controller is in a running position and only after a definite action of said electro-responsive means.

21. In a controller for electric vehicles, in combination, batteries for supplying power, electro-responsive means for connecting said batteries in circuit in either series or parallel, a hand controller for said electro-responsive means, and means associated with a brake mechanism of the vehicle for controlling said electro-responsive means to disconnect said batteries fro circuit independently of said master controller and when said master controller is in "batteries-series" position to also cause said electro-responsive means to again connect said batteries in circuit and in series but only after parallel connection thereof.

22. In a controller for electric vehicles, in combination, a driving motor, batteries for supplying power, hand-operated means for starting and accelerating said motor by commutation of said batteries from parallel to series and foot-operated means for stopping said motor independently of said hand-operated means and for restarting and accelerating but only when said hand-operated means is in a running position, and only by first paralleling said batteries.

23. The combination with a motor operated vehicle having a non-locking braking mechanism and a locking brake mechanism, of a master controller for said vehicle, and means associated with said brake mechanism for stopping the vehicle independently of said master controller, the means associated with said non-locking mechanism being also adapted to restart but only when said master switch is in a running position.

24. The combination with a vehicle having a locking brake mechanism of a hand operated power controller for said vehicle, means associated with said brake mechanism for interrupting the power supply of said vehicle, and means controlled by said hand-operated controller to render said former means ineffective to reëstablish the power supply.

25. In a controller for electric vehicles, in combination, an electro-responsive starting and accelerating means, a master switch controlling said means, a switch connected to a brake mechanism of the vehicle to control said means to interrupt the power supply independently of said master switch and to restart but only when said master switch is in a running position, and only under the power conditions first established by said master switch.

26. In a controller for electric vehicles, in combination, electro-responsive starting and accelerating means, a master switch, a switch connected with a brake mechanism of the vehicle for controlling said means, said latter switch being operable to stop independently of said master switch and also when said master switch is in a running position to restore the vehicle to the speed at which said master switch is set but only after progressive establishment of circuits previously established by said master switch.

27. In a controller for electric vehicles, in combination, electro-responsive starting and accelerating means, a master switch therefor, a switch associated with a brake mechanism of the vehicle for controlling said means to stop and also restart when said master switch is in a running position, and means insuring against starting by either said master switch or said brake switch with an abnormal inrush of current.

28. In a controller for electric vehicles, in combination, a driving motor, batteries for supplying power, electro-responsive means for starting said motor and commutating said batteries, a hand-operated switch and a brake switch controlling said means, said brake switch being adapted to stop said motor independently of said hand switch and to restart but only when said hand switch is in a running position and the batteries in parallel, and means for preventing series connection of said batteries by either of said switches while abnormal conditions prevail.

29. In a controller for electric motor operated vehicles, in combination, electro-responsive starting and accelerating means, a master switch for said means, a switch associated with a brake mechanism of the vehicle for controlling said means to stop and start while said master switch is in a running position and automatic governing means for said electro-responsive means effective during the control of the latter either by said master switch or by said brake switch.

30. In a controller for electric motor operated vehicles, in combination, electro-responsive starting means, a master switch operable to energize said means, means preventing the response of said starting means in certain running positions of said master switch, and a switch associated with a brake mechanism of the vehicle to deënergize said starting means and to control said second-mentioned means to again energize said starting means without further operation of said master switch.

31. In combination, a motor having a plurality of field windings, means for establishing either series or parallel connections for the motor field windings, and a resistance associated with said means to preserve the continuity of the motor circuit during commutation of the motor field windings and to be connected in parallel to the motor field winding upon parallel connection of the latter.

In witness whereof, I have hereunto subscribed my name in the presence of two witnesses.

GUY R. RADLEY.

Witnesses:
FRANK H. HUBBARD,
WALTER E. SARGENT.